United States Patent
Lee et al.

(10) Patent No.: US 11,397,666 B2
(45) Date of Patent: Jul. 26, 2022

(54) COMPUTERIZED SYSTEMS AND METHODS FOR GENERATING AND MODIFYING DATA FOR MODULE IMPLEMENTATION

(71) Applicant: Coupang Corp., Seoul (KR)

(72) Inventors: Jeong Hoon Lee, Kyunggido (KR); Yong Seok Jang, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/095,106

(22) Filed: Nov. 11, 2020

(65) Prior Publication Data

US 2022/0043741 A1    Feb. 10, 2022

Related U.S. Application Data

(63) Continuation of application No. 16/986,574, filed on Aug. 6, 2020, now Pat. No. 10,877,877.

(51) Int. Cl.
*G06F 9/44* (2018.01)
*G06F 11/36* (2006.01)
*G06F 11/00* (2006.01)
*G06F 9/455* (2018.01)
(Continued)

(52) U.S. Cl.
CPC ...... *G06F 11/3688* (2013.01); *G06F 11/3457* (2013.01); *G06F 11/368* (2013.01); *G06F 11/3692* (2013.01); *H04L 67/28* (2013.01)

(58) Field of Classification Search
CPC ............ G06F 11/3688; G06F 11/3684; G06F 11/3664; G06F 11/3692; G06F 11/3672; G06F 9/54; G06F 11/3457; G06F 11/368; G06F 9/546; H04L 67/28
See application file for complete search history.

(56) References Cited

U.S. PATENT DOCUMENTS

| 9,600,432 B2 * | 3/2017 | Armstead ................. G06F 9/54 |
| 9,846,639 B2 * | 12/2017 | Raghavan ........... G06F 11/3684 |
| 10,877,877 B1 | 12/2020 | Lee et al. |

(Continued)

FOREIGN PATENT DOCUMENTS

| CN | 106959920 A | 7/2017 |
| KR | 10-2004-0079339 | 9/2004 |

OTHER PUBLICATIONS

Triou et al., Declarative Testing: A Paradigm for Testing Software Applications, 5 pages (Year: 2009).*

(Continued)

*Primary Examiner* — Thuy Dao
(74) *Attorney, Agent, or Firm* — Finnegan, Henderson, Farabow, Garrett & Dunner LLP

(57) ABSTRACT

The present disclosure may be directed to a system for generating and modifying data for modules. The system may include receiving, from a user via a proxy server, a request and user information associated with the user; based on the determination that the request comprises a test, calling a mobile application programming interface. The mobile application programming interface may be configured to perform steps including retrieving data; performing the test on the module using the retrieved data; performing a verification on responses from the test to predetermined responses; and sending results of the performed verification to the user. The system may include implementing the module based on the performed verification.

20 Claims, 12 Drawing Sheets

(51) Int. Cl.
*H04L 67/56* (2022.01)
*G06F 11/34* (2006.01)

(56) References Cited

U.S. PATENT DOCUMENTS

| | | |
|---|---|---|
| 2013/0326074 A1 | 12/2013 | He et al. |
| 2015/0363304 A1 | 12/2015 | Nagamalla et al. |
| 2016/0092348 A1 | 3/2016 | Straub et al. |
| 2018/0060210 A1 | 3/2018 | Pandey et al. |
| 2018/0089068 A1 | 3/2018 | Bhojan |

OTHER PUBLICATIONS

Office Action and Search Report dated Jul. 23, 2021, by the Taiwanese Patent Office in counterpart Taiwanese Application No. 109147138, 8 pages.

Segura et al., Metamorphic Testing of RESTful Web APIs, 1 page (Year: 2018).

Notice of Preliminary Rejection dated Sep. 16, 2021, by the Korean Intellectual Property Office in counterpart Korean Application No. 10-2020-0178945, 13 pages.

International Search Report and Written Opinion dated May 12, 2021, in PCT International Application No. PCT/IB2021/051249, 9 pages.

Notice of Final Rejection in counterpart Korean Patent Application No. 10-2020-0178945 dated Feb. 15, 2022, (7 pages).

Notice of Final Rejection after Re-Examination in counterpart Korean Patent Application No. 10-2020-0178945 dated Apr. 21, 2022, (8 pages).

\* cited by examiner

US 11,397,666 B2

COMPUTERIZED SYSTEMS AND METHODS FOR GENERATING AND MODIFYING DATA FOR MODULE IMPLEMENTATION

CROSS-REFERENCE TO RELATED APPLICATIONS

This application is a continuation of and claims the benefit of priority to U.S. application Ser. No. 16/986,574, filed Aug. 6, 2020 (now allowed), the contents of which are hereby incorporated herein by reference.

TECHNICAL FIELD

The present disclosure generally relates to computerized systems and methods for generating and modifying data for modules. In particular, embodiments of the present disclosure relate to inventive and unconventional systems related to using a proxy server and calling a mobile application programming interface to perform tests on modules and to implement modules.

BACKGROUND

Module implementation by developers often relies on testing modules in order to successfully deploy and manage new and existing modules. When modules are not tested, the intended behavior of the module may not be preserved. Module tests include controls that are critical to preserving the intended behavior of a module, especially when the module is modified or when new modules are implemented.

Module testing often involves the use of static test data. However, the use of static test data does not result in effective module testing for every module. For example, testing modules that depend on time-sensitive factors (e.g., dates) using static test data may not produce realistic results. For these modules, dynamic (e.g., real-time) or mock test data may produce more realistic results. For other modules, static test data may produce more realistic results. In some cases, modules may need to be implemented without testing.

The quality of an organization's online platform and, consequently, the experiences of users are severely reduced when the online platform includes faulty modules that have not been tested properly or when the implementation of modules that do not require testing is delayed due to module testing. The quality of an organization's online platform would be significantly improved if the online platform automatically determined which modules required testing and which modules could be implemented accordingly.

Therefore, there is a need for improved systems and methods for performing tests on modules and implementing modules.

SUMMARY

One aspect of the present disclosure is directed to a system for generating and modifying data for modules. The system may include a memory storing instructions and at least one processor configured to execute the instructions to receive, from a user via a proxy server, a request and user information associated with the user; based on the determination that the request comprises a test, call a mobile application programming interface. The mobile application programming interface may be configured to perform steps including retrieving data; performing the test on the module using the retrieved data; performing a verification on responses from the test to predetermined responses; and sending results of the performed verification to the user. The system instructions may include implementing the module based on the performed verification.

Another aspect of the present disclosure is directed to a method for generating and modifying data for modules. The method may include receiving, from a user via a proxy server, a request and user information associated with the user; based on the determination that the request comprises a test, calling a mobile application programming interface. The mobile application programming interface may be configured to perform steps including retrieving data; performing the test on the module using the retrieved data; performing a verification on responses from the test to predetermined responses; and sending results of the performed verification to the user. The method may include implementing the module based on the performed verification.

Yet another aspect of the present disclosure is directed to a system for generating and modifying data for modules. The system may include a memory storing instructions and at least one processor configured to execute the instructions to receive, from a user via a proxy server, a request and user information associated with the user; based on the determination that the request comprises a test, call a mobile application programming interface. The mobile application programming interface may be configured to perform steps including retrieving data, wherein the data comprises generated simulation data including at least one of test users, test device identifications, test platforms, test requested information, test sample identification, or test responses; performing the test on the module using the retrieved data; performing a verification on responses from the test to predetermined responses; and sending results of the performed verification to the user. The system instructions may include implementing the module based on the performed verification.

Other systems, methods, and computer-readable media are also discussed herein.

DETAILED DESCRIPTION

Figure 1A:
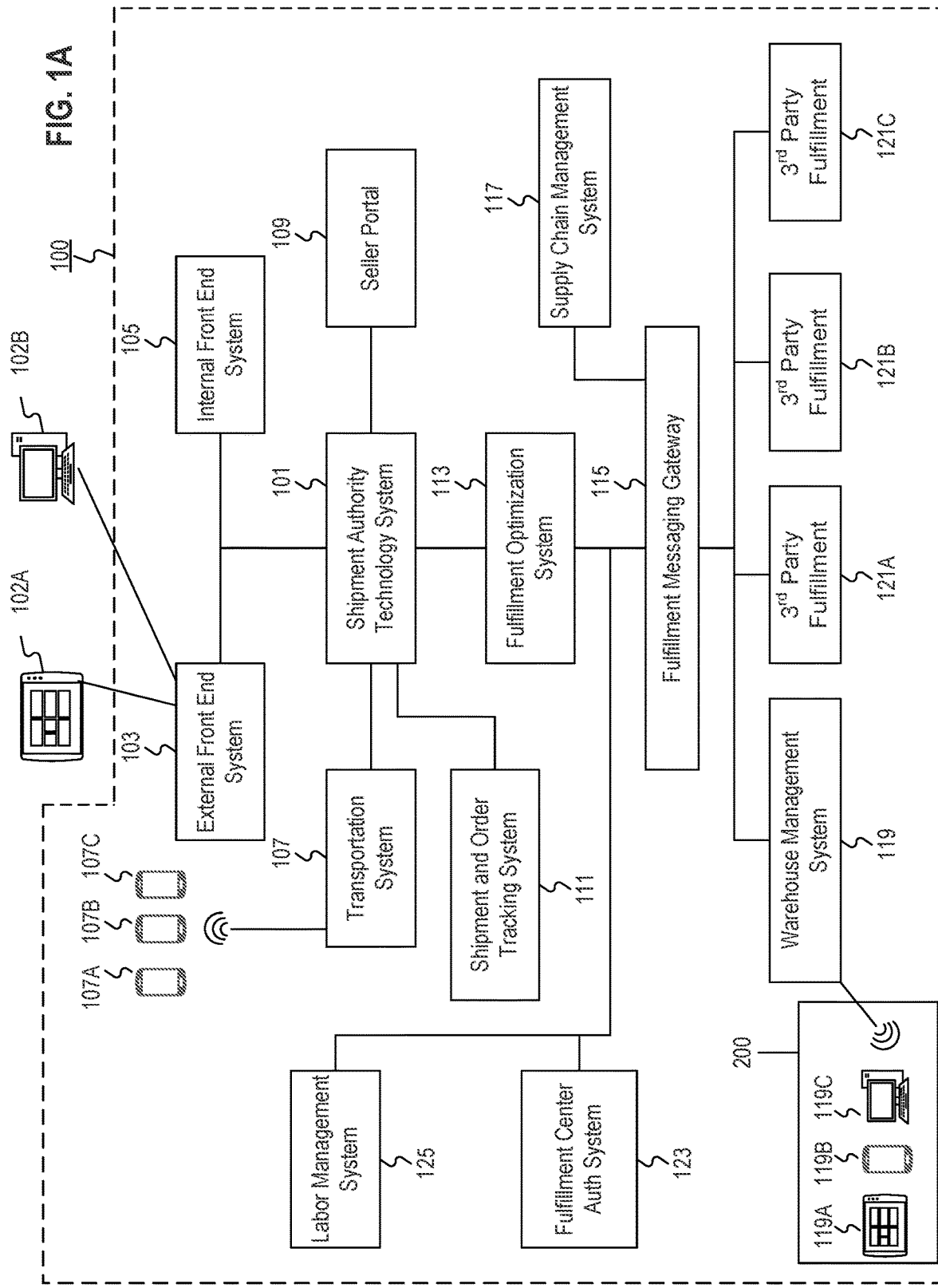
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Detail Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for generating and modifying data for modules. The disclosed embodiments may include users submitting a request to generate or modify data for modules via user devices. A proxy server may receive the request and transmit the request to a request identifier of the proxy server. The request may include user information such as a module identifier associated with a module and a test setting that indicates whether the request includes a module test and the parameters (e.g., type of test data, override settings, etc.) associated with the test.

In some embodiments, the request identifier may determine that the request includes a test based on a loaded test setting of the request. The request identifier may determine whether the request includes a requirement that the data to be used in the test is mock data. A data loader may call a mobile application programming interface (MAPI) based on the determination. An internal application programming interface (API) gateway may retrieve the module associated with the request, at least one module test (e.g., verification tests), and data (e.g., real-time, mock, etc.) to be used on the test and send the retrieved module, module test, and data to at least one modular provider. The internal API gateway may receive the module associated with the request, module test, and data from the modular providers. The internal API gateway may perform the module tests on the modules using the data. The module test may include predetermined responses such that the internal API gateway may perform a verification test on the modules by comparing the module test responses of backend domains to the predetermined responses. For example, the implementation of a module that labels a product banner with a special deal for certain members may be compared to the predetermined response that users with an identification (e.g., user identification, device identification, etc.) associated with the special deal will see the special deal on the product webpage and users without an identification associated with the special deal will not see the special deal on the product webpage. A backend domain may send a response to a user device via the proxy server, where the response may include the results of the performed verification (e.g., webpage data, webpage display, product data, seller data, user interaction with the webpage, etc.) and an indication of whether the module may be implemented.

In some embodiments, based on a determination (e.g., automatically or by users) that the results of the performed verification meet a threshold, the tested module may be implemented by applying real-time data and the module to at least one of the backend domains. Upon the module implementation, the backend domain may send a response to the user device via the proxy server, where the response may include an indication that the module is implemented or analytical data associated with the module implementation (e.g., webpage data, webpage display, product data, seller data, user interaction with the webpage, etc.).

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
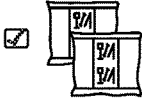
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
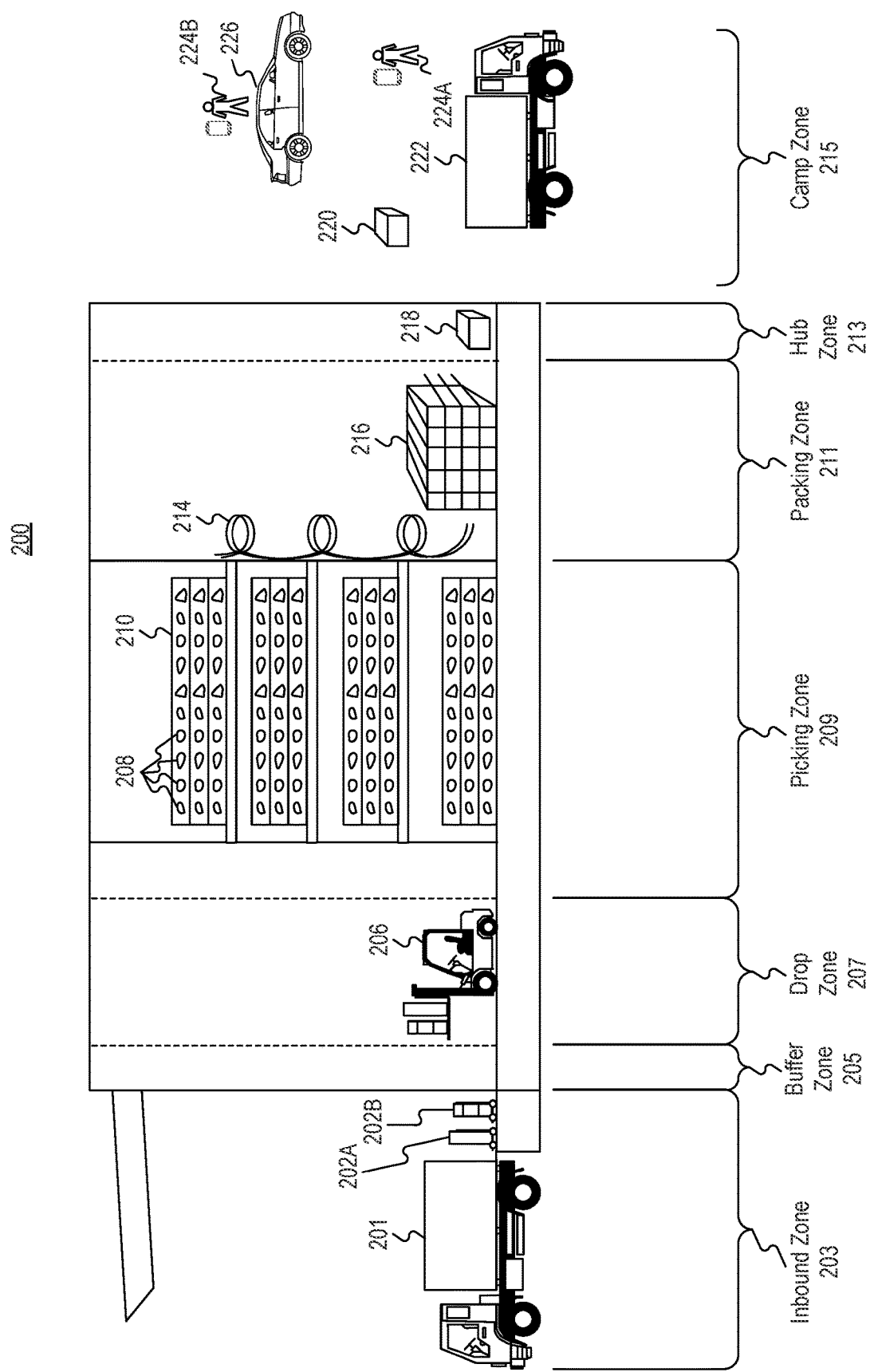
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 1198.

Once a user places an order, a picker may receive an instruction on device 1198 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
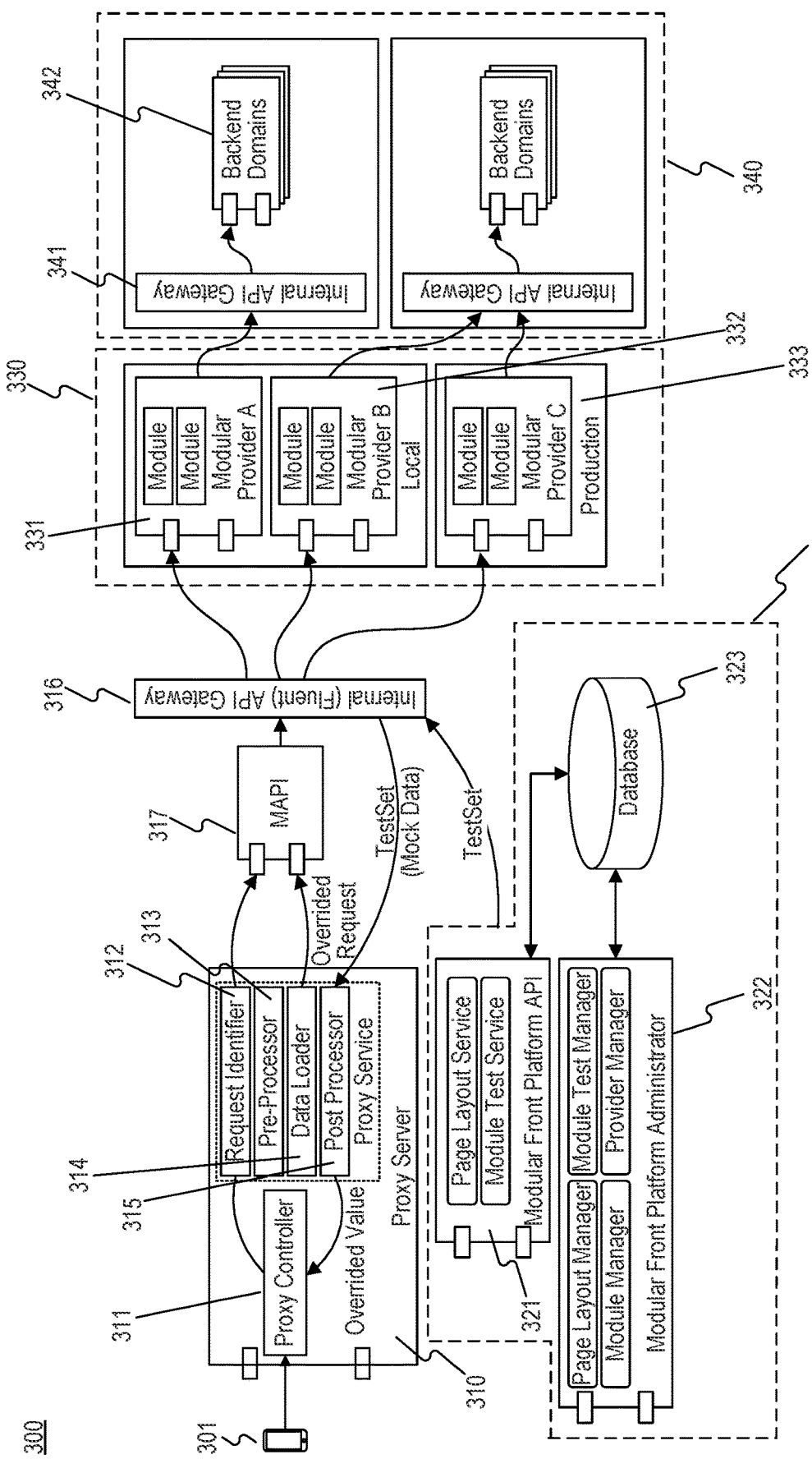
FIG. 3 is a schematic block diagram illustrating an exemplary embodiment of a network comprising computerized systems for generating and modifying data for module implementation, consistent with disclosed embodiments.

Referring to FIG. 3, a schematic block diagram illustrating an exemplary embodiment of a network comprising computerized systems for generating and modifying data for module implementation, consistent with disclosed embodiments is shown. As illustrated in FIG. 3, a system 300 may include a user device 301, a proxy server 310, a mobile application programming interface (MAPI) 315, an internal fluent application programming interface (API) gateway 316, system 320, system 330, and system 340, each of which may communicate with each other via a network. In some embodiments, the systems and components of system 300 may communicate with the other components of system 300 via a direct connection, for example, using a cable. In some other embodiments, system 300 may be a part of system 100 of FIG. 1A and may communicate with the other components of system 100 via a network or via a direct connection, for example, using a cable. The systems and components of system 300 may each comprise a single computer or may each be configured as a distributed computer system including multiple computers that interoperate to perform one or more of the processes and functionalities associated with the disclosed examples.

Proxy server 310 may include a proxy controller 311 and a proxy service including a request identifier 312, a preprocessor 313, a data loader 314, and a post processor 315. System 320 may include a modular front platform API 321, which may include a page layout service and a module test service. System 320 may include a modular front platform administrator 322, which may include a page layout manager, a module test manager, a module manager, and a provider manager. System 320 may include a database 323. System 330 may include at least one modular provider, such as modular providers 331-333 (e.g., modular providers A, B, C, etc.), where each modular provider may include at least one module. System 340 may include at least one internal API gateway 341 and at least one respective backend domain 342.

System 300 may comprise processors, memories, and databases. The processors may be one or more known processing devices, such as a microprocessor from the Pentium™ family manufactured by Intel™ or the Turion™ family manufactured by AMD™. The processors may constitute a single core or multiple core processor that executes parallel processes simultaneously. For example, the processors may use logical processors to simultaneously execute and control multiple processes. The processors may implement virtual machine technologies or other known technologies to provide the ability to execute, control, run, manipulate, store, etc. multiple software processes, applications, programs, etc. In another example, the processors may include a multiple-core processor arrangement configured to provide parallel processing functionalities to allow system 300 to execute multiple processes simultaneously. One of ordinary skill in the art would understand that other types of processor arrangements could be implemented that provide for the capabilities disclosed herein.

The memories may store one or more operating systems that perform known operating system functions when executed by the processors, respectively. By way of example, the operating system may include Microsoft Windows, Unix, Linux, Android, Mac OS, iOS, or other types of operating systems. Accordingly, examples of the disclosed invention may operate and function with computer systems running any type of operating system. The memories may be a volatile or non-volatile, magnetic, semiconductor, tape, optical, removable, non-removable, or other type of storage device or tangible computer readable medium.

The databases (e.g., database 323) may include, for example, Oracle™ databases, Sybase™ databases, or other relational databases or non-relational databases, such as Hadoop™ sequence files, HBase™, or Cassandra™. The databases may include computing components (e.g., database management system, database server, etc.) configured to receive and process requests for data stored in memory devices of the database(s) and to provide data from the database(s). The databases may include NoSQL databases such as HBase, MongoDB™ or Cassandra™. Alternatively, the databases may include relational databases such as Oracle, MySQL and Microsoft SQL Server. In some embodiments, the databases may take the form of servers, general purpose computers, mainframe computers, or any combination of these components.

The databases may store data that may be used by the processors for performing methods and processes associated with disclosed examples. The databases may be located in the systems or components of system 300 or, alternatively, they may be in external storage devices located outside of the systems or components of system 300. Data stored in the databases may include any suitable data associated with users or modules (e.g., test data, real-time data, module data, test results, real-time user interactions with online platform, test user interactions with online platform, etc.).

User device 301 may be a tablet, mobile device, computer, or the like. User device 301 may include a display. The display may include, for example, liquid crystal displays (LCD), light emitting diode screens (LED), organic light emitting diode screens (OLED), a touch screen, and other known display devices. The display may show various information to a user. For example, it may display a webpage (e.g., FIGS. 1B-1E) that includes an implemented module or an option to test a module. User device 301 may include one or more input/output (I/O) devices. The I/O devices may include one or more devices that allow user device 301 to send and receive information from user device 301 or another device. The I/O devices may include various input/output devices, a camera, a microphone, a keyboard, a mouse-type device, a gesture sensor, an action sensor, a physical button, an oratory input, etc. The I/O devices may also include one or more communication modules (not shown) for sending and receiving information from proxy server 310 by, for example, establishing wired or wireless connectivity between user device 301 and proxy server 310.

In some embodiments, the users associated with user device 301 may be internal users (e.g., employees of an organization that develops, owns, operates, or leases systems 100 or 300). Internal front end system 105 may be implemented as a computer system that enables the users associated with user device 301 to interact with system 300. For example, in some embodiments, internal front end system 105 may be implemented as a web server that enables the users associated with user device 301 to modify modules, add new modules, submit requests to test (e.g., perform verifications on) modules, submit requests to implement modules (e.g., modules may be implemented by inserting the module into a webpage), to view diagnostic and statistical information about tested or implemented modules, etc. In some embodiments, internal front end system 105 may run custom web server software designed to receive and process requests from systems or devices depicted in systems 100 or 300, acquire information from databases (e.g., database 323) and other data stores based on those requests, and provide responses to the received requests based on acquired information.

Modular front platform API 321 of system 320 may create, read, or modify data such as test data or modules (e.g., users may generate, modify, or submit test data or modules to system 300 via modular front platform API 321). Modular front platform administrator 322 may manage services required to fulfill calls to modular front platform API 321 received from internal API gateway 316 and to return appropriate responses to internal (fluent) API gateway 316 (e.g., modular front platform API 321 may appropriately return test data to internal API gateway 316 when internal API gateway 316 calls for a test). Database 323 may store data from system 300, such as generated, modified, or submitted test data or modules. Internal API gateway 316 may be fluent, advantageously providing an easily readable (e.g., code that can be read as human language), flowing interface gateway that may mimic a domain specific language. Fluent API gateways may increase the efficiency of methods performed in system 300 by providing a context for further actions for each method performed.

Modules may include labeling a product banner or header of a product on a webpage, where the product banner may indicate a discounted product, a product promotion (e.g., a product promotion associated with a season or holiday), or a special deal for certain users (e.g., certain users may be considered "high-value" if they are frequent customers, hold a special membership, etc.).

Internal API gateway 341 of system 340 may receive modules associated and data (e.g., test data or real-time data) from modular providers 331-333. In some embodiments, modular providers 331-333 may be used based on the type of data to be used during testing. For example, modular providers 331 and 332 may be "local" modular providers that use test data (e.g., mock data) while modular provider 333 may be a "production" modular provider that uses real-time data (e.g., data from actual production). Internal API gateway 341 may implement modules by inserting the modules into at least one webpage of backend domains 342 of system 340. Upon the module implementation, backend domain 342 may send responses to user device 301 via proxy server 310.

Figure 4:
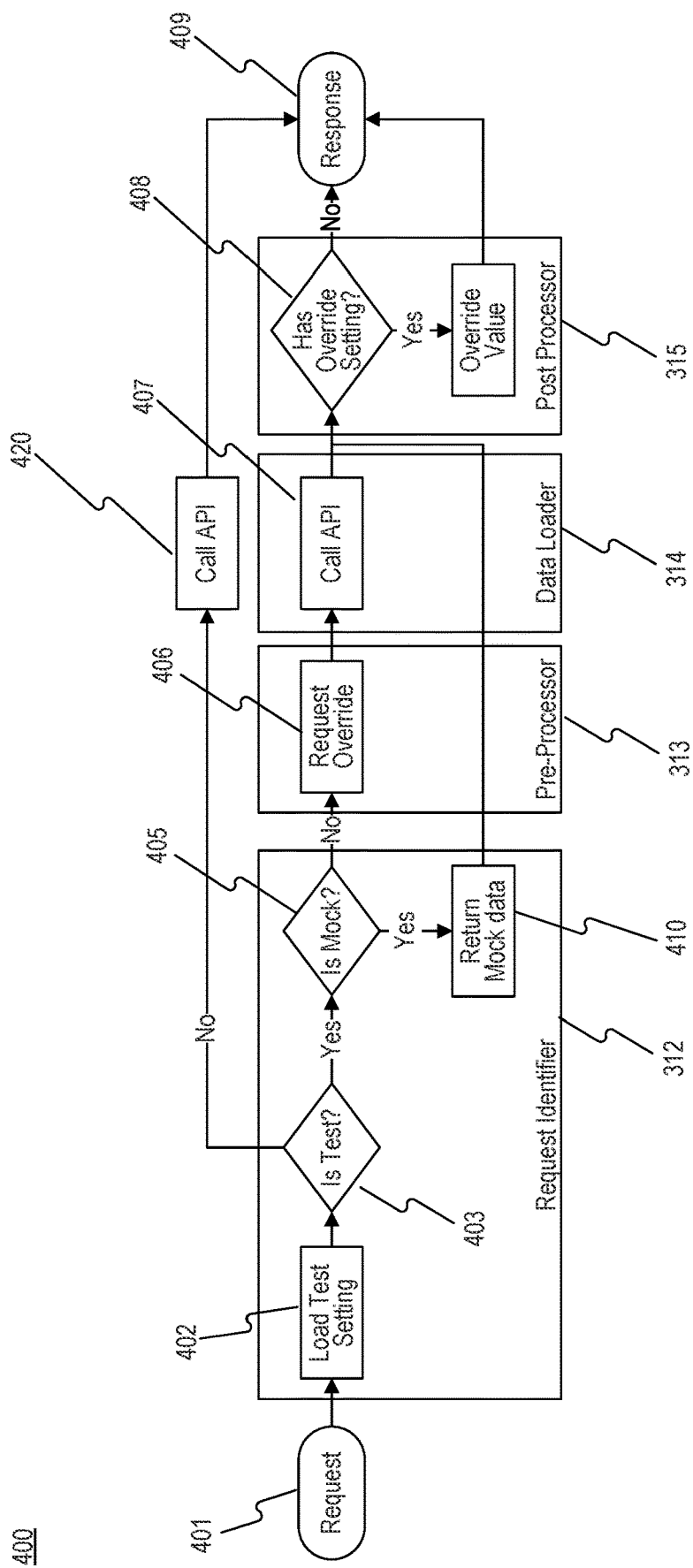
FIG. 4 depicts a process for generating and modifying data for module implementation, consistent with disclosed embodiments.

Referring to FIG. 4, a process 400 for generating and modifying data for module implementation, consistent with disclosed embodiments is shown.

At step 401, user device 301 may submit a request to generate or modify data for modules. Proxy server 310 may receive the request via proxy controller 311, which may transmit the request to request identifier 312. The request may include a module identifier associated with a module and a test setting that indicates whether the request includes a module test and the parameters (e.g., type of test data, override settings, etc.) associated with the test. At step 402, request identifier 312 may load the test setting of the request.

At step 403, request identifier 312 may determine whether the request includes a module test based on the loaded test setting of the request. Request identifier 312 may determine that the request does not include a test and at step 420, call MAPI 317 based on the determination. Based on the call to MAPI 317, internal API gateway 316 may retrieve the module associated with the request and real-time data from system 320 and send the retrieved module and real-time data to at least one of modular providers 331-333. Internal API gateway 341 may receive the module associated with the request and real-time data from modular providers 331-333 of system 330. Based on the determination that the request does not include a test, internal API gateway 341 may implement the module associated with the request by inserting the module into at least one webpage of backend domains 342 of system 340. Upon the module implementation, backend domain 342 may send a response to user device 301 via proxy server 310, where the response may include an indication that the module is implemented or analytical data associated with the module implementation (e.g., webpage data, webpage display, product data, seller data, user interaction with the webpage, etc.).

Going back to step 403, request identifier 312 may determine that the request includes a test based on the loaded test setting of the request. At step 405, request identifier 312 may determine whether the request includes a requirement that the data to be used in the test is mock data. Request identifier 312 may determine that the request does not include a requirement that the test use mock data. At step 406, pre-processor 313 may request an override for real-time test data and at step 407, data loader 314 may call MAPI 317 based on the determination.

At step 408, post processor 315 may determine whether the request includes an override setting. Based on a determination that the request does not include an override setting and based on the call to MAPI 317, internal API gateway 316 may retrieve the module associated with the request, at least one module test (e.g., verification tests), and real-time data to be used on the test from system 320 and send the retrieved module, module test, and real-time data to at least one of modular providers 331-333. Internal API gateway 341 may receive the module associated with the request, module test, and real-time data from modular providers 331-333 of system 330. Internal API gateway 341 may perform the module tests on the modules using the real-time data, thereby allowing the modules to be tested in realistic scenarios (e.g., real-time data may be used to replicate or simulate real user interactions with the tested module). Real-time data may include user identifications, device identifications, etc. The module test may include predetermined responses such that internal API gateway 341 may perform a verification test on the modules by comparing the module test responses of backend domains 342 to the predetermined responses. For example, the implementation of a module that labels a product banner with a special deal for certain members may be compared to the predetermined response that users with an identification (e.g., user identification, device identification, etc.) associated with the special deal will see the special deal on the product webpage and users without an identification associated with the special deal will not see the special deal on the product webpage.

At step 409, backend domain 342 may send a response to user device 301 via proxy server 310, where the response may include the results of the performed verification (e.g., webpage data, webpage display, product data, seller data, user interaction with the webpage, etc.) and an indication of whether the module may be implemented.

Based on a determination (e.g., automatically by system 300 or by users) that the results of the performed verification meet a threshold, the tested module may be implemented by applying inserting the module into at least one webpage of backend domains 342 of system 340. Upon the module implementation, backend domain 342 may send a response to user device 301 via proxy server 310, where the response may include an indication that the module is implemented or analytical data associated with the module implementation (e.g., webpage data, webpage display, product data, seller data, user interaction with the webpage, etc.). Based on a determination that the results of the performed verification do not meet the threshold, the tested module may be further developed (e.g., modified) before it is implemented.

Going back to step 408, post processor 315 may determine that the request includes an override setting. If the request includes an override value that meets the threshold of the override setting, then internal API gateway 341 may implement the module, in a manner described previously, without performing a module test. For example, an override setting may allow tests to be bypassed or mock data to be applied based on an override value. The override value may include client identifications, path or query conditions, time period, user member status, age of the module (e.g., time the module was created or submitted), etc.

At step 409 upon the module implementation, backend domain 342 may send a response to user device 301 via proxy server 310, where the response may include an indication that the module is implemented or analytical data associated with the module implementation (e.g., webpage data, webpage display, product data, seller data, user interaction with the webpage, etc.).

Going back to step 405, request identifier 312 may determine that the request includes a requirement that the test use mock data. At step 410, data loader 314 may call MAPI 317 and return mock data for the test based on the determination.

At step 408, post processor 315 may determine whether the request includes an override setting. Based on a determination that the request does not include an override setting and based on the call to MAPI 317, internal API gateway 316 may retrieve the module associated with the request, at least one module test (e.g., verification tests), and mock data to be used on the test from system 320 and send the retrieved module, module test, and mock data to at least one of modular providers 331-333. Internal API gateway 341 may receive the module associated with the request, module test, and mock data from modular providers 331-333 of system 330. Internal API gateway 341 may perform the module tests on the modules using the mock data. Mock data and module tests may include user-generated or computer-generated user identifications, device identifications, descriptions, mock test set identifications, test unit identifications, target methods, target request paths, target request queries, target request hosts, target request bodies, platforms, responses, preprocesses, postprocesses, mock test request forgery identifications, actions, action keys, action values, date and time, test samples, products, filters, filter keys, product categories, etc. The module test may include predetermined responses such that internal API gateway 341 may perform a verification test on the modules by comparing the module test responses of backend domains 342 to the predetermined responses. Backend domain 342 may send a response to user device 301 via proxy server 310, where the response may include the results of the performed verification (e.g., webpage data, webpage display, product data, seller data, user interaction with the webpage, etc.) and an indication of whether the module may be implemented. Based on a determination (e.g., automatically by system 300 or by users) that the results of the performed verification meet a threshold, the tested module may be implemented by inserting the module into at least one webpage of backend domains 342 of system 340.

At step 409 upon the module implementation, backend domain 342 may send a response to user device 301 via proxy server 310, where the response may include an indication that the module is implemented or analytical data associated with the module implementation (e.g., webpage data, webpage display, product data, seller data, user interaction with the webpage, etc.). Based on a determination that the results of the performed verification do not meet the threshold, the tested module may be further developed (e.g., modified) before it is implemented.

Going back to step 408, post processor 315 may determine that the request includes an override setting. If the request includes an override value that meets the threshold of the override setting, then internal API gateway 341 may implement the module, in a manner described previously, without performing a module test.

At step 409 upon the module implementation, backend domain 342 may send a response to user device 301 via proxy server 310, where the response may include an indication that the module is implemented or analytical data associated with the module implementation (e.g., webpage data, webpage display, product data, seller data, user interaction with the webpage, etc.).

Figure 5:
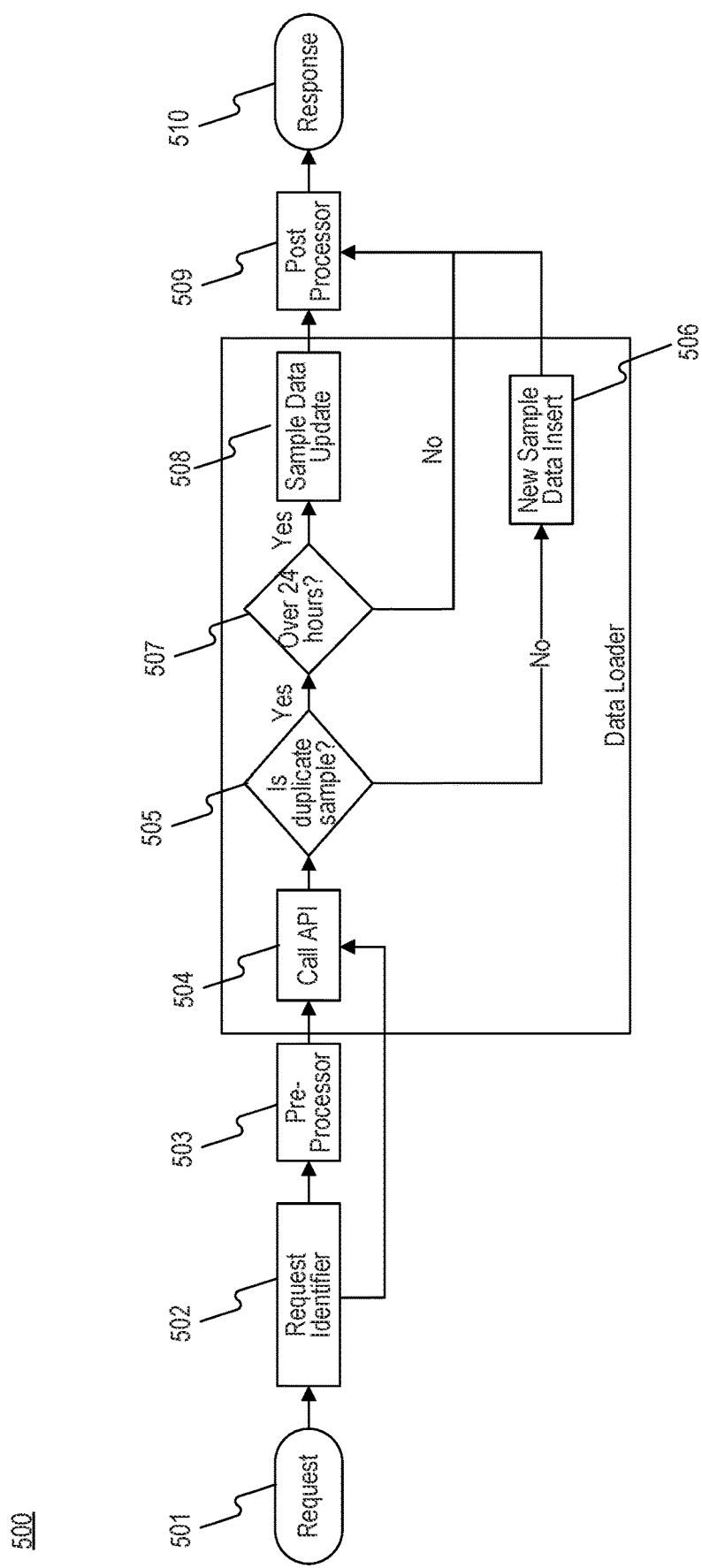
FIG. 5 depicts a process for generating and modifying data for module implementation, consistent with disclosed embodiments.

Referring to FIG. 5, a process 500 for generating and modifying data for module implementation, consistent with disclosed embodiments is shown.

At step 501, a user may submit a request to generate or modify data for modules via user device 301 in a manner similar to step 401 of process 400. The request may include sample data that may be used in a module test. For example, proxy server 310 may receive the request via proxy controller 311, which may transmit the request to request identifier 312. The request may include a module identifier associated with a module and a test setting that indicates whether the request includes a module test and the parameters (e.g., type of test data, override settings, etc.) associated with the test.

At step 502, request identifier 312 may load the test setting of the request. Request identifier 312 may determine whether the request includes a module test based on the loaded test setting of the request. Request identifier 312 may determine that the request includes a test based on the loaded test setting of the request. Request identifier 312 may determine whether the request includes a requirement that the data (e.g., the sample data) to be used in the test is mock data. Request identifier 312 may determine that the request does not include a requirement that the test use mock data. At step 503, pre-processor 313 may request an override for real-time test data and at step 504, data loader 314 may call MAPI 317 based on the determination.

At step 505, data loader 314 may determine whether the submitted sample data is duplicate data by calling MAPI 317 to determine whether database 323 includes the submitted sample data. MAPI 317 may send a response to data loader 314 that indicates that the submitted sample data is not duplicate data. At step 506 upon receiving the response, data loader 313 may insert the new sample data as test data and process 500 may proceed to step 509 in a manner similar to process 400. If MAPI 317 sends a response to data loader 314 that indicates that the submitted sample data is duplicate data, then process 500 may proceed to step 507.

At step 509, post processor 315 may determine whether the request includes an override setting. Based on a determination that the request does not include an override setting and based on the call to MAPI 317, internal API gateway 316 may retrieve the module associated with the request, at least one module test (e.g., verification tests), and real-time data to be used on the test from system 320 and send the retrieved module, module test, and real-time data to at least one of modular providers 331-333. Internal API gateway 341 may receive the module associated with the request, module test, and real-time data from modular providers 331-333 of system 330. Internal API gateway 341 may perform the module tests on the modules using the real-time data, thereby allowing the modules to be tested in realistic scenarios (e.g., real-time data may be used to replicate or simulate real user interactions with the tested module). Real-time data may include user identifications, device identifications, etc. The module test may include predetermined responses such that internal API gateway 341 may perform a verification test on the modules by comparing the module test responses of backend domains 342 to the predetermined responses. For example, the implementation of a module that labels a product banner with a special deal for certain members may be compared to the predetermined response that users with an identification (e.g., user identification, device identification, etc.) associated with the special deal will see the special deal on the product webpage and users without an identification associated with the special deal will not see the special deal on the product webpage.

At step 510, backend domain 342 may send a response to user device 301 via proxy server 310, where the response may include the results of the performed verification (e.g., webpage data, webpage display, product data, seller data, user interaction with the webpage, etc.) and an indication of whether the module may be implemented.

Based on a determination (e.g., automatically by system 300 or by users) that the results of the performed verification meet a threshold, the tested module may be implemented by applying inserting the module into at least one webpage of backend domains 342 of system 340. Upon the module implementation, backend domain 342 may send a response to user device 301 via proxy server 310, where the response may include an indication that the module is implemented or analytical data associated with the module implementation (e.g., webpage data, webpage display, product data, seller data, user interaction with the webpage, etc.). Based on a determination that the results of the performed verification do not meet the threshold, the tested module may be further developed (e.g., modified) before it is implemented.

Going back to step 509, post processor 315 may determine that the request includes an override setting. If the request includes an override value that meets the threshold of the override setting, then internal API gateway 341 may implement the module, in a manner described previously, without performing a module test. For example, an override setting may allow tests to be bypassed or mock data to be applied based on an override value. The override value may include client identifications, path or query conditions, time period, user member status, age of the module (e.g., time the module was created or submitted), etc.

At step 510 upon the module implementation, backend domain 342 may send a response to user device 301 via proxy server 310, where the response may include an indication that the module is implemented or analytical data associated with the module implementation (e.g., webpage data, webpage display, product data, seller data, user interaction with the webpage, etc.).

At step 507, data loader 314 may determine whether the duplicate sample data has been stored in database 323 for more than twenty-four hours by calling MAPI 317. MAPI 317 may send a response to data loader 314 that indicates that the duplicate sample data has not been stored in database 323 for more than twenty-four hours. Upon receiving the response, data loader 314 may not insert the submitted duplicate sample data and process 500 may proceed to steps 509 and 510 as described above. If MAPI 317 sends a response to data loader 314 that indicates that the duplicate sample data has been stored in database 323 for more than twenty-four hours, then at step 508, data loader 314 may update the sample data with the submitted sample data, where the submitted sample data may be inserted as test data. Process 500 may proceed to steps 509 and 510 as described above.

Going back to step 502, request identifier 312 may determine that the request includes a requirement that the test use mock data. Data loader 314 may call MAPI 317 and return mock data for the test based on the determination and proceeds to steps 509 and 510 as described above.

Figure 6:
FIG. 6 depicts a sample SRP that includes an implemented module and one or more search results satisfying a search request along with interactive user interface elements, consistent with the disclosed embodiments.

Referring to FIG. 6, a sample SRP 600 that includes an implemented module 601 and one or more search results 603 satisfying a search request along with interactive user interface elements, consistent with the disclosed embodiments is shown. For example, the implemented module 601 may include labeling a product banner or header of a product on a webpage, where the product banner may indicate a special deal for certain users (e.g., certain users may be considered "high-value" if they are frequent customers, hold a special membership, etc.). For example, sample SRP 600 may display search results 603 of a high-value user, where search results 603 include an expedited delivery of products to the high-value user.

Figure 7:
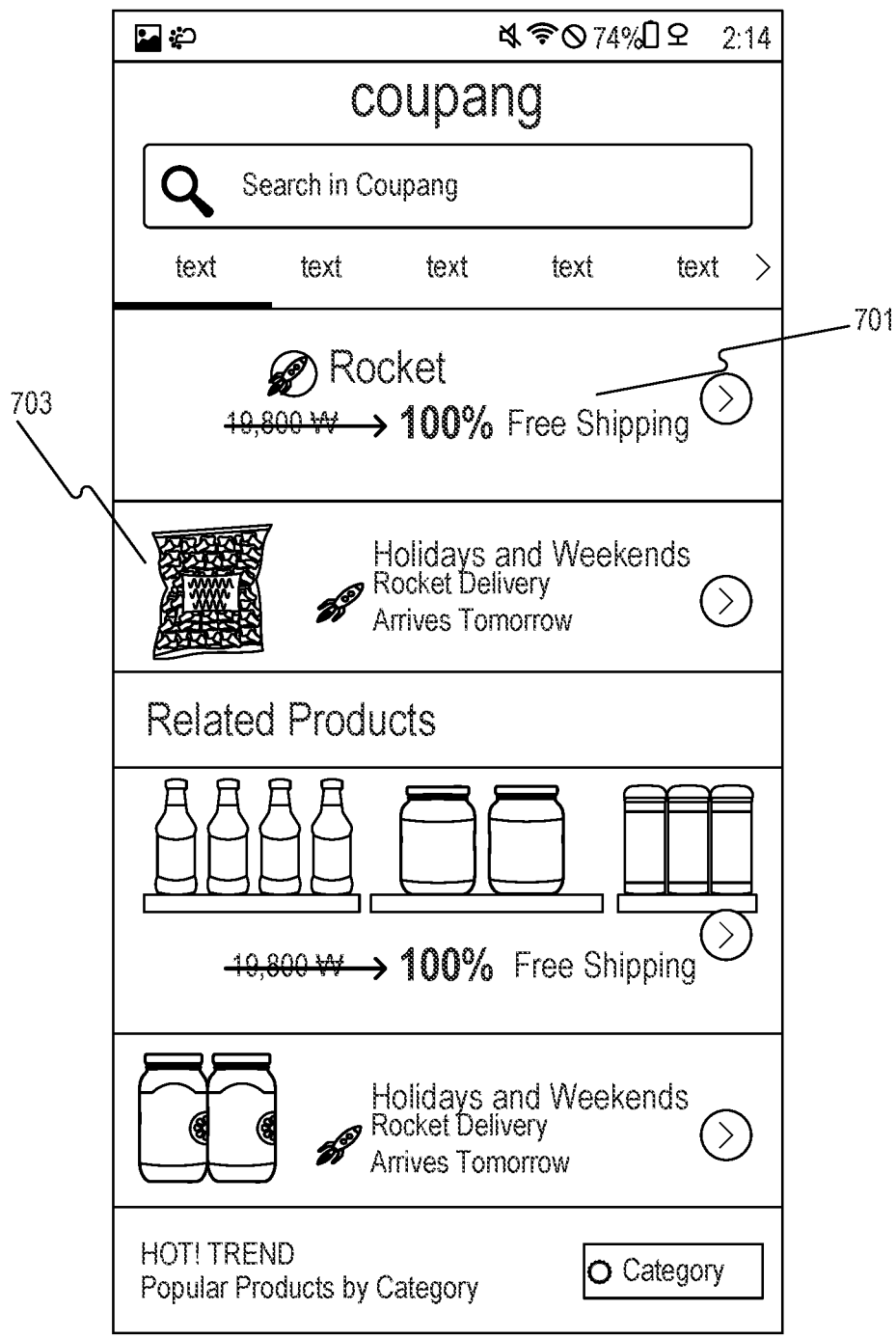
FIG. 7 depicts a sample SDP that includes an implemented module, a product, and information about the product along with interactive user interface elements, consistent with the disclosed embodiments.

Referring to FIG. 7, a sample SDP 700 that includes an implemented module 701, a product 703, and information about the product along with interactive user interface elements, consistent with the disclosed embodiments is shown. For example, implemented module 701 may include labeling a product banner or header of a product on a webpage, where the product banner may indicate a special deal for certain users (e.g., certain users may be considered "high-value" if they are frequent customers, hold a special membership, etc.). For example, sample SDP 700 may display free and expedited shipping of products to the high-value user.

Figure 8:
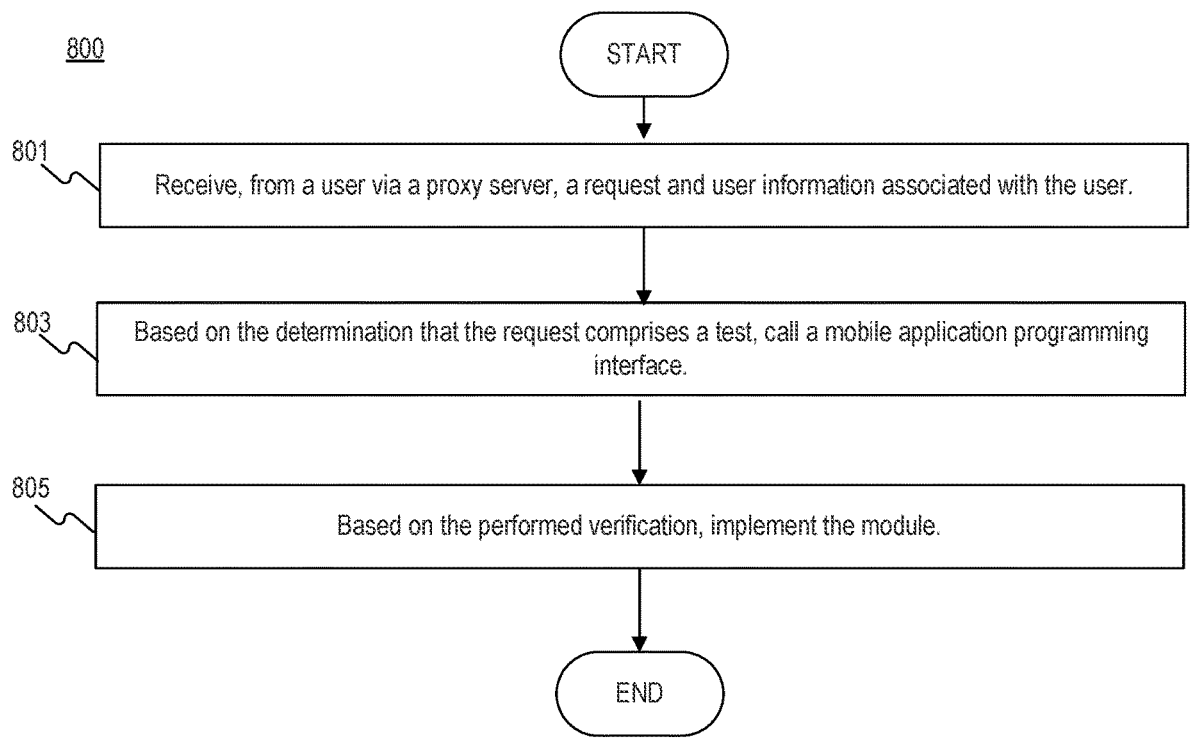
FIG. 8 depicts a process for generating and modifying data for module implementation, consistent with disclosed embodiments.

Referring to FIG. 8, a process 800 for generating and modifying data for module implementation, consistent with disclosed embodiments is shown.

At step 801, a user may submit a request to generate or modify data for modules via user device 301. Proxy server 310 may receive the request via proxy controller 311, which may transmit the request to request identifier 312. The request may include user information such as a module identifier associated with a module and a test setting that indicates whether the request includes a module test and the parameters (e.g., type of test data, override settings, etc.) associated with the test. Request identifier 312 may load the test setting of the request.

At step 803, request identifier 312 may determine that the request includes a test based on the loaded test setting of the request. Request identifier 312 may determine whether the request includes a requirement that the data to be used in the test is mock data. Data loader 314 may call MAPI 317 based on the determination. Internal API gateway 316 may retrieve the module associated with the request, at least one module test (e.g., verification tests), and data (e.g., real-time, mock, etc.) to be used on the test from system 320 and send the retrieved module, module test, and data to at least one of modular providers 331-333. Internal API gateway 341 may receive the module associated with the request, module test, and data from modular providers 331-333 of system 330. Internal API gateway 341 may perform the module tests on the modules using the data. The module test may include predetermined responses such that internal API gateway 341 may perform a verification test on the modules by comparing the module test responses of backend domains 342 to the predetermined responses. For example, the implementation of a module that labels a product banner with a special deal for certain members may be compared to the predetermined response that users with an identification (e.g., user identification, device identification, etc.) associated with the special deal will see the special deal on the product webpage and users without an identification associated with the special deal will not see the special deal on the product webpage. Backend domain 342 may send a response to user device 301 via proxy server 310, where the response may include the results of the performed verification (e.g., webpage data, webpage display, product data, seller data, user interaction with the webpage, etc.) and an indication of whether the module may be implemented.

At step 805, based on a determination (e.g., automatically by system 300 or by users) that the results of the performed verification meet a threshold, the tested module may be implemented by applying the real-time data and the module to at least one of backend domains 342 of system 340. Upon the module implementation, backend domain 342 may send a response to user device 301 via proxy server 310, where the response may include an indication that the module is implemented or analytical data associated with the module implementation (e.g., webpage data, webpage display, product data, seller data, user interaction with the webpage, etc.).

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for generating and modifying data for modules, comprising:
a memory storing instructions; and
at least one processor configured to execute the instructions to:
based on a determination that a received request comprises a test, call an application programming interface, wherein the application programming interface is configured to perform steps comprising:
performing the test on the module using retrieved data;
performing a verification on responses from the test; and
sending results of the performed verification to a user;
based on the performed verification, implement the module.

2. The system of claim 1, wherein based on a determination that the received request does not comprise a test, the instructions comprise:
calling the application programming interface; and
implementing the module.

3. The system of claim 1, wherein the received request comprises a requirement that the retrieved data comprises mock data.

4. The system of claim 3, wherein the steps further comprise:
determining that the test comprises an override setting;
determining that the received request comprises an override value associated with the override setting; and
based on the determination that the received request comprises the override value associated with the override setting, implementing the module without performing the test.

5. The system of claim 3, wherein the steps further comprise:
determining that the test comprises an override setting;

determining that the received request does not comprise an override value associated with the override setting; and implementing the module based on the performed verification.

6. The system of claim 3, wherein the steps further comprise:

determining that the test does not comprise an override setting; and implementing the module based on the performed verification.

7. The system of claim 1, wherein the received request comprises a requirement that the retrieved data comprises real data.

8. The system of claim 7, wherein the instructions further comprise:

requesting an override action based on a determination that the test does not require mock data;

calling the application programming interface;

determining that the test comprises an override setting;

determining that the received request comprises an override value associated with the override setting; and implementing the module without performing the test based on the determination that the received request comprises the override value associated with the override setting.

9. The system of claim 7, wherein the instructions further comprise:

requesting an override action based on a determination that the test does not require mock data;

calling the application programming interface;

determining that the test comprises an override setting;

determining that the received request does not comprise an override value associated with the override setting; and implementing the module based on the performed verification.

10. The system of claim 7, wherein the instructions further comprise:

requesting an override action based on a determination that the test does not require mock data;

calling the application programming interface;

determining that the test does not comprise an override setting; and implementing the module based on the performed verification.

11. A computer-implemented method for generating and modifying data for modules, comprising:

based on a determination that a received request comprises a test, calling an application programming interface, wherein the application programming interface is configured to perform steps comprising:

performing the test on the module using retrieved data;

performing a verification on responses from the test; and sending results of the performed verification to a user;

based on the performed verification, implementing the module.

12. The method of claim 11, further comprising:

based on a determination that the received request does not comprise a test:

calling the application programming interface; and implementing the module.

13. The method of claim 11, wherein the received request comprises a requirement that the retrieved data comprises mock data.

14. The method of claim 13, wherein the steps further comprise:

determining that the test comprises an override setting;

determining that the received request comprises an override value associated with the override setting; and based on the determination that the received request comprises the override value associated with the override setting, implementing the module without performing the test.

15. The method of claim 13, wherein the steps further comprise:

determining that the test comprises an override setting;

determining that the received request does not comprise an override value associated with the override setting; and implementing the module based on the performed verification.

16. The method of claim 13, wherein the steps further comprise:

determining that the test does not comprise an override setting; and implementing the module based on the performed verification.

17. The system of claim 11, wherein the received request comprises a requirement that the retrieved data comprises real data.

18. The method of claim 11, further comprising:

requesting an override action based on a determination that the test does not require mock data;

calling the application programming interface;

determining that the test comprises an override setting;

determining that the received request comprises an override value associated with the override setting; and implementing the module without performing the test based on the determination that the received request comprises the override value associated with the override setting.

19. The method of claim 11, further comprising:

requesting an override action based on a determination that the test does not require mock data;

calling the application programming interface;

determining that the test comprises an override setting;

determining that the received request does not comprise an override value associated with the override setting; and implementing the module based on the performed verification.

20. The method of claim 17, further comprising:

requesting an override action based on a determination that the test does not require mock data;

calling the application programming interface;

determining that the test does not comprise an override setting; and implementing the module based on the performed verification.

\* \* \* \* \*